(No Model.)

E. ROGERS.
SAUSAGE MACHINE.

No. 452,238. Patented May 12, 1891.

Witnesses
Geo. E. Frech
Wm. Bagger

Inventor
Edward Rogers
By his Attorneys,
C. A. Snow & Co.

UNITED STATES PATENT OFFICE.

EDWARD ROGERS, OF STEWARTSVILLE, KENTUCKY.

SAUSAGE-MACHINE.

SPECIFICATION forming part of Letters Patent No. 452,238, dated May 12, 1891.

Application filed November 15, 1890. Serial No. 371,512. (No model.)

*To all whom it may concern:*

Be it known that I, EDWARD ROGERS, a citizen of the United States, residing at Stewartsville, in the county of Grant and State of Kentucky, have invented a new and useful Sausage-Machine, of which the following is a specification.

This invention relates to machines for chopping meat for the manufacture of sausages and for similar purposes; and it has for its object to provide a machine of this class which shall possess superior advantages in point of simplicity, durability, and general efficiency.

With these ends in view the invention consists in the improved construction, arrangement, and combination of parts, which will be hereinafter fully described, and particularly pointed out in the claims.

Figure 1:
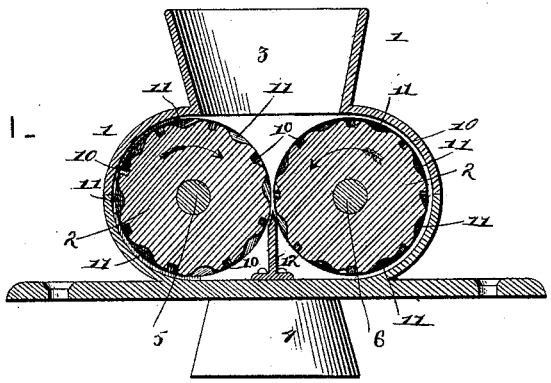
Figure 2:
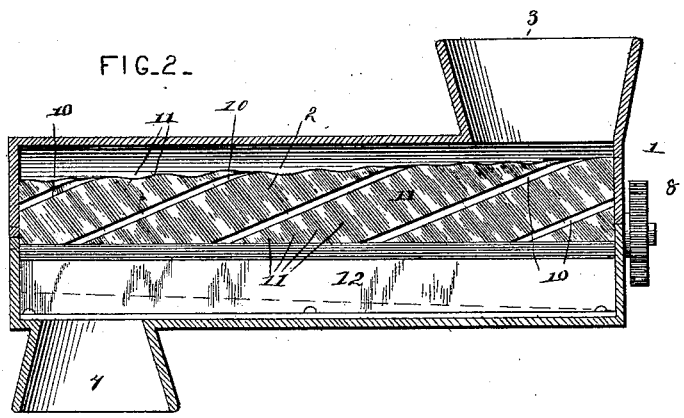
Figure 3:
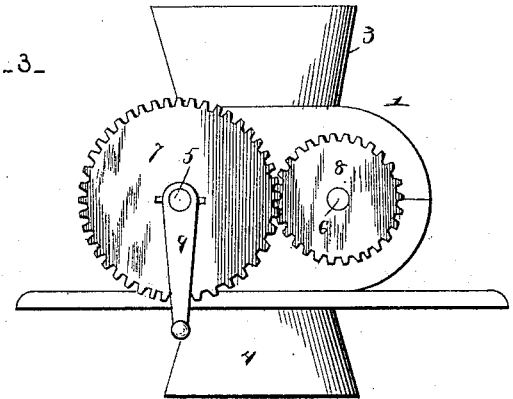

In the drawings hereto annexed, Figure 1 is a vertical transverse sectional view of a machine constructed in accordance with my invention. Fig. 2 is a longitudinal sectional view taken on the line 2 2 in Fig. 1. Fig. 3 is a front view.

Like numerals of reference indicate like parts in all the figures.

The shell or casing of my improved machine, which is designated by 1, is made oval or elliptical in cross-section, so as to accommodate cylindrical rolls 2 2, which are mounted upon shafts having their bearings in the front and rear ends of said casing. The latter is provided at one end with a feed-opening or hopper 3, and at the opposite end with a discharge-spout 4. The shafts, which are designated by 5 and 6, are extended through the front end of the casing, and are provided, respectively, with a spur-wheel 7 and a pinion 8, meshing with the said spur-wheel. The shaft 5 is also provided with a crank or handle 9, by means of which it may be rotated, thus transmitting a rotary motion at an increased rate of speed to the shaft 6. The rollers 2 2, which are mounted upon the shafts 5 and 6, and which are thus rotated at differential rates of speed, are provided with grooves or corrugations 10, extending spirally the entire length of said rolls. Between the said grooves 10 the surfaces of said rolls are provided with spiral corrugations or undulations, as 11, crossing the spiral grooves or concavities 10, and forming in their entirety spiral flutes traversing said grooves 10 from end to end of each roll, so as to have a grinding action upon the material which is fed into the machine. The spiral grooves 10 serve as conveyers to carry the chopped meat in the direction of the end of the machine, which is provided with the discharge-spout 4.

12 designates the knife or cutter, which is suitably secured to the bottom of the shell or casing between the rolls 2 2, between which the edge of said cutter extends, as will be clearly seen in Fig. 1 of the drawings. It will be readily understood that when the rolls are rotated in opposite directions, as indicated by arrows in Fig. 1, the material fed into the machine will not only be ground, but will be finely chopped by the conjoint action of the corrugated rolls and the knife or cutter. The efficacy of the grinding action of the rolls is increased by the fact that they are operated at different rates of speed, as above described.

Having thus described my invention, what I claim is—

1. In a meat-chopper, the combination of the shell or casing having the hopper and the discharge-spout, the revolving spirally-corrugated rolls having spiral grooves intersecting or traversing the spiral corrugations, and a knife or cutter arranged longitudinally between the said rolls, substantially as and for the purpose set forth.

2. In a meat-chopper, the combination of the shell or casing having the hopper and discharge-spout, the rolls mounted in said casing and having spiral grooves intersecting or traversing the spiral corrugations, the knife or cutter interposed between said rolls, a spur-wheel mounted upon the shaft of one of said rolls and meshing with a smaller spur-wheel or pinion upon the shaft of the other roll, whereby the said rolls shall be rotated at different rates of speed, and an operating crank or handle, substantially as and for the purpose set forth.

In testimony that I claim the foregoing as my own I have hereto affixed my signature in presence of two witnesses.

EDWARD ROGERS.

Witnesses:
J. T. FRANKS,
S. W. BEVERLY.